(12) United States Patent
Reznar et al.

(10) Patent No.: US 9,702,386 B2
(45) Date of Patent: Jul. 11, 2017

(54) QUICKIE STUD ASSEMBLY

(75) Inventors: Jason Reznar, Redford, MI (US);
Chuck A. Deperro, Ferndale, MI (US);
Aaron D. Pokowski, St. Clair Shores, MI (US)

(73) Assignee: A. RAYMOND ET CIE, Grenoble (FR)

( * ) Notice: Subject to any disclaimer, the term of this patent is extended or adjusted under 35 U.S.C. 154(b) by 701 days.

(21) Appl. No.: 13/699,099

(22) PCT Filed: Jul. 8, 2011

(86) PCT No.: PCT/US2011/043277
§ 371 (c)(1),
(2), (4) Date: Jun. 26, 2013

(87) PCT Pub. No.: WO2012/006481
PCT Pub. Date: Jan. 12, 2012

(65) Prior Publication Data
US 2013/0266394 A1    Oct. 10, 2013

Related U.S. Application Data

(60) Provisional application No. 61/362,851, filed on Jul. 9, 2010.

(51) Int. Cl.
| | | |
|---|---|---|
| *F16B 41/00* | (2006.01) |
| *F16B 5/02* | (2006.01) |
| *F16B 37/04* | (2006.01) |
| *B60R 13/02* | (2006.01) |
| *F16B 33/00* | (2006.01) |
| *F16B 17/00* | (2006.01) |
| *F16B 31/04* | (2006.01) |

(52) U.S. Cl.
CPC ........ *F16B 5/0208* (2013.01); *B60R 13/0206* (2013.01); *F16B 33/002* (2013.01); *F16B 37/043* (2013.01); *F16B 41/002* (2013.01); *F16B 5/02* (2013.01); *F16B 17/008* (2013.01); *F16B 31/04* (2013.01)

(58) Field of Classification Search
CPC ..... F16B 41/002; F16B 37/043; F16B 37/044
USPC ................ 411/107, 112, 120, 970
See application file for complete search history.

(56) References Cited

U.S. PATENT DOCUMENTS

| | | | | |
|---|---|---|---|---|
| 484,745 | A | * | 10/1892 | Pugh .............................. 411/120 |
| 878,258 | A | * | 2/1908 | Volk .............................. 411/120 |
| 1,291,250 | A | * | 1/1919 | Teague .......................... 411/120 |
| 2,307,747 | A | * | 1/1943 | Pflueger ............... A01K 89/015 403/259 |
| 2,571,786 | A | * | 10/1951 | Tinnerman .................... 411/112 |
| 2,760,540 | A | * | 8/1956 | Poupitch ....................... 411/112 |
| 4,270,591 | A | * | 6/1981 | Gill et al. ..................... 411/112 |
| 4,524,986 | A | * | 6/1985 | Ward ............................ 280/851 |

(Continued)

*Primary Examiner* — Flemming Saether
(74) *Attorney, Agent, or Firm* — McDonald Hopkins LLC (57) ABSTRACT

A stud assembly may be used to secure one item, such as a panel, to a second item, such as a second panel. The stud assembly may include a fastener, a first clip having a fastener portion and a retaining portion, the retaining portion having at least one aperture, where the first clip is attached to the fastener at the fastener portion, and a second clip attached to the fastener and spaced from the fastener portion of the first clip, the second clip having at least one tab, where the tab engages the aperture to secure the first clip to the second clip.

16 Claims, 7 Drawing Sheets

(56) References Cited

U.S. PATENT DOCUMENTS

| | | | |
|---|---|---|---|
| 5,407,310 A * | 4/1995 | Kassouni | B29C 70/76 29/525.02 |
| 7,527,464 B2 * | 5/2009 | Stewart et al. | 411/107 |
| 8,920,089 B1 * | 12/2014 | Stewart | F16B 5/0258 411/112 |
| 2013/0183117 A1 * | 7/2013 | Warburton | 411/119 |

* cited by examiner

QUICKIE STUD ASSEMBLY

CROSS-REFERENCE TO RELATED APPLICATION

This application claims benefit from U.S. Provisional Patent Application No. 61/362,851, entitled "Quickie Stud Assembly," filed on Jul. 9, 2010, which is hereby incorporated in its entirety by reference.

FIELD OF INVENTION

The present invention generally relates to fasteners and, more particularly, to a stud assembly for substantially reducing torque loss.

BACKGROUND

Fastening devices are often utilized for securing various components together. A variety of fastening devices may be used within a variety of industries, such as the automotive industry, for coupling various components together. For example, fastening devices may be used to secure two or more panels together in a vehicle.

During installation of many products, it is necessary to secure two or more components together, such as securing two or more panels together. Many difficulties may be encountered during the manufacture and assembly of these fastening components. For example, various components of the fastening devices may require different tools in order to assemble the components thus requiring additional processes to assemble the components. As a result, use of a variety of numerous tools is time consuming and costly for manufacturers. In addition, the components of the fastening devices may require secondary processes to finish the assembly of the fastening device, raising the costs further.

Figure 1:
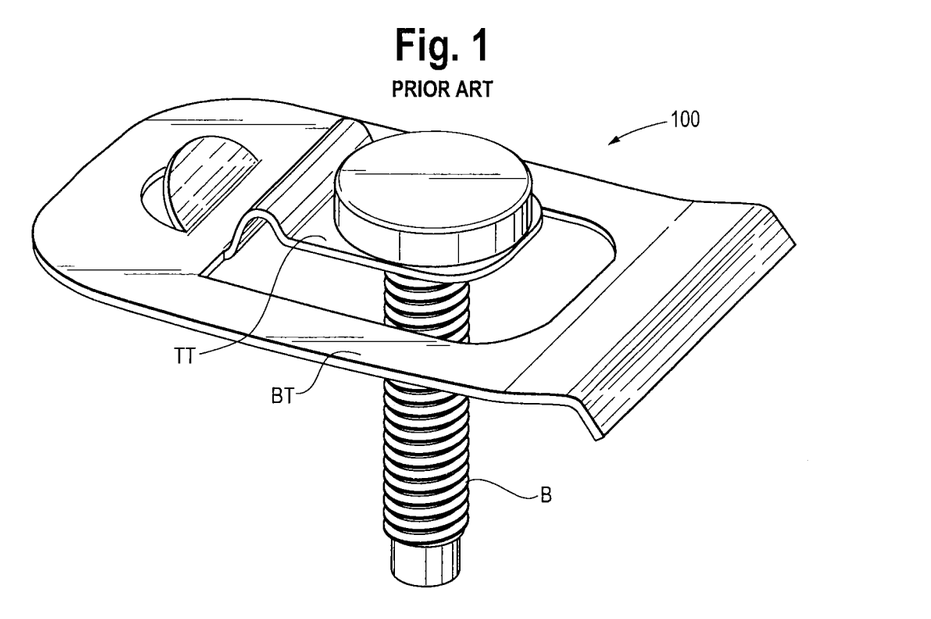
FIG. 1 is a top perspective view of a prior art stud assembly.
Figure 2:
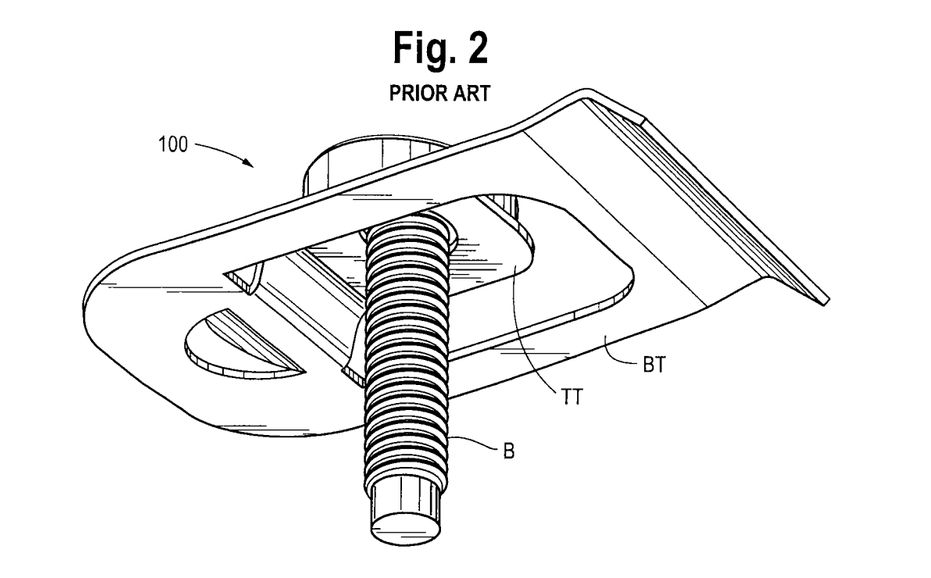
FIG. 2 is a bottom perspective view of the prior art stud assembly.
Figure 3:
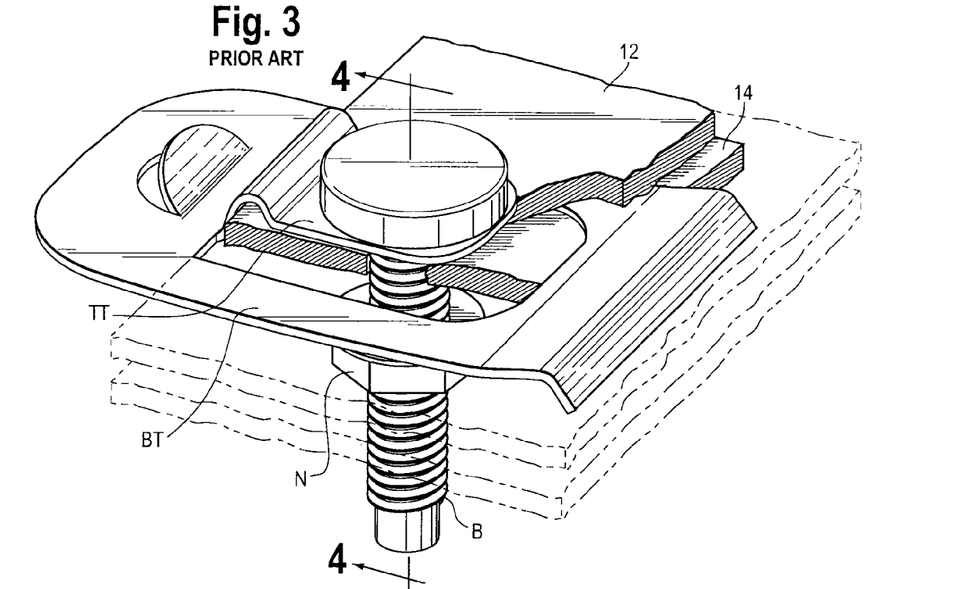
FIG. 3 is a top perspective view of the prior art stud assembly of FIG. 1 in use with two panels.
Figures 4, 5:
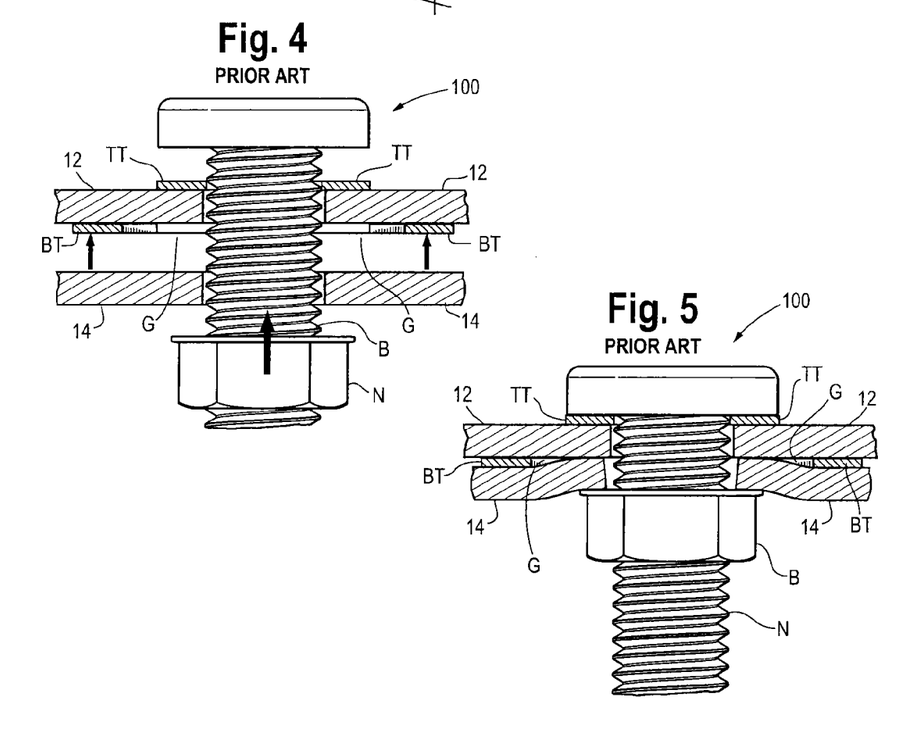
FIG. 4 is a front cross-sectional view of the prior art stud assembly of FIG. 3 along line 4-4.
FIG. 5 is a front cross-sectional view of the prior art stud assembly of FIG. 3 in use with two panels.

An example of a prior art stud assembly 100 to attach components together is shown in FIGS. 1-5. This stud assembly 100 may be drawn from one blank of steel, an example of which is shown in FIGS. 1-5. This may create a two tiered component out of one piece, whereby the stud assembly 100 includes a top tier TT and a bottom tier BT. The top tier TT may crimp to the bolt B while the bottom tier BT may be the "spring" leg that keeps the assembly in contact with one of the two panels 12, 14, an example of which is shown in FIGS. 3-5.

This type of stud assembly 100, however, may create a gap G between two panels 12, 14 to be fastened together, an example of which is shown in FIG. 5. This gap G may create or result in sporadic torque or torque loss during installation and/or measuring of the nut N to the bolt B. The gap G may also create distortion in the mating panels 12, 14. FIG. 5 illustrates an exaggerated view depicting why sporadic torque or torque loss is undesirable. The material in the second panel 14 has room to deflect during torquing due to the gap G, which can be seen in FIG. 5.

Therefore, there is a need for a stud assembly that reduces the gap present between panels being attached, helps substantially eliminate distortion, helps prevent torque loss and is of a lower cost to manufacture and assemble.

SUMMARY

A stud assembly capable of attaching a first panel and a second panel together, the stud assembly includes a fastener, a first clip having a fastener portion and a retaining portion, the retaining portion having at least one aperture, where the first clip is attached to the fastener at the fastener portion, and a second clip attached to the fastener and spaced from the fastener portion of the first clip, the second clip having at least one tab, where the tab engages the aperture to secure the first clip to the second clip.

In an alternative embodiment, a stud assembly may include a bolt, a first clip having a first snap member and an aperture, where the bolt is received through the aperture, a second clip attached to the bolt a predetermined distance from the first clip, the second clip having a second snap member, where the first snap member selectively snap fits onto the second snap member attaching the first clip to the second clip.

Finally, in yet another alternative embodiment, a stud assembly for securing first and second panels together may include a bolt capable of engaging the first and second panels, a first clip having a bolt section and a retaining section, where the bolt is received within the bolt section. The stud assembly may also include an aperture positioned on the retaining section of the first clip, a second clip having a bolt aperture, where the bolt is received within the bolt aperture and is positioned a predetermined distance from the first clip, a male snap member attached to the second clip, the male snap member engaged with the aperture to secure the first clip to the second clip, and where the first panel is positionable in the predetermined distance between the first and second clips.

DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An exemplary embodiment of a quickie stud assembly 10 is shown in FIGS. 6-12. The quickie stud assembly 10 may be utilized to secure various components together. By way of a non-limiting example, the quickie stud assembly 10 may be used to secure any two or more panels 12, 14 together, such as for example, that may be part of a vehicle (not shown), such as panels 12, 14 in a steering column (not shown) of a vehicle (not shown). Any appropriate number of quickie stud assemblies 10 may be used to secure the desired components together, not just that shown in the drawings. By way of a non-limiting example, at least one of the panels 12, 14, or both, may include a keyway (not shown) of a mating shape to that of the quickie stud assembly 10 whereby the quick stud assembly 10 may be inserted into the keyway (not shown) and then tightened to secure the first panel 12 to the second panel 14. While fastening panels 12, 14 together is disclosed herein, the quickie stud assembly 10 is not limited to attaching panels 12, 14. The quickie study assembly 10 may be used to attach or secure any two appropriate components together, not just that shown.

Figure 6:
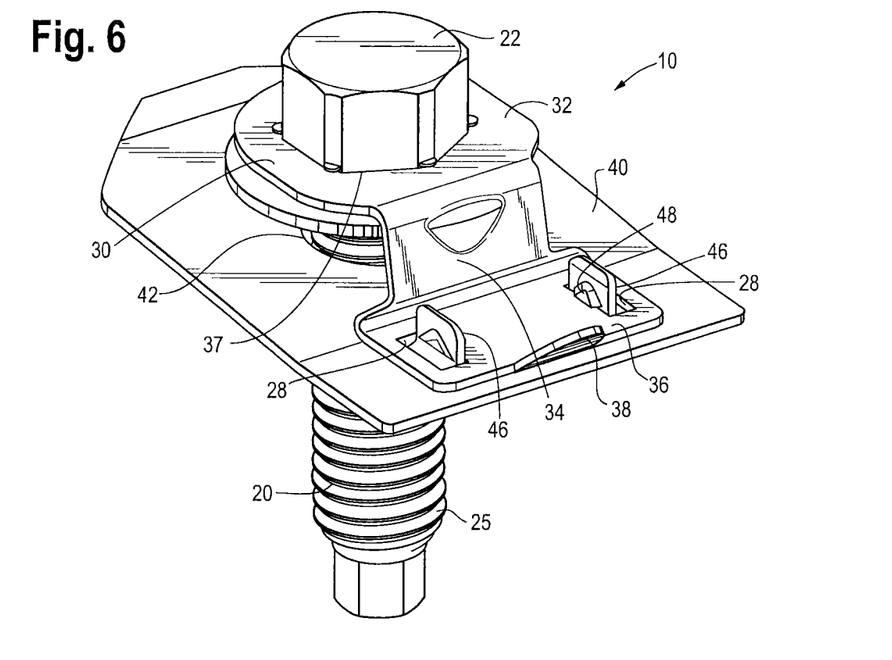
FIG. 6 is top a perspective view of an embodiment of a quickie stud assembly.
Figure 7:
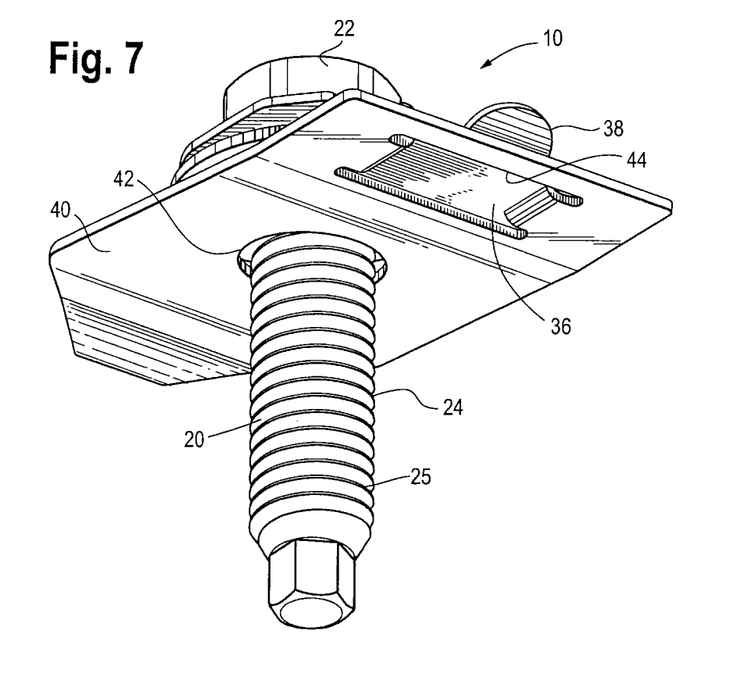
FIG. 7 is bottom a perspective view of an embodiment of a quickie stud assembly.
Figure 10:
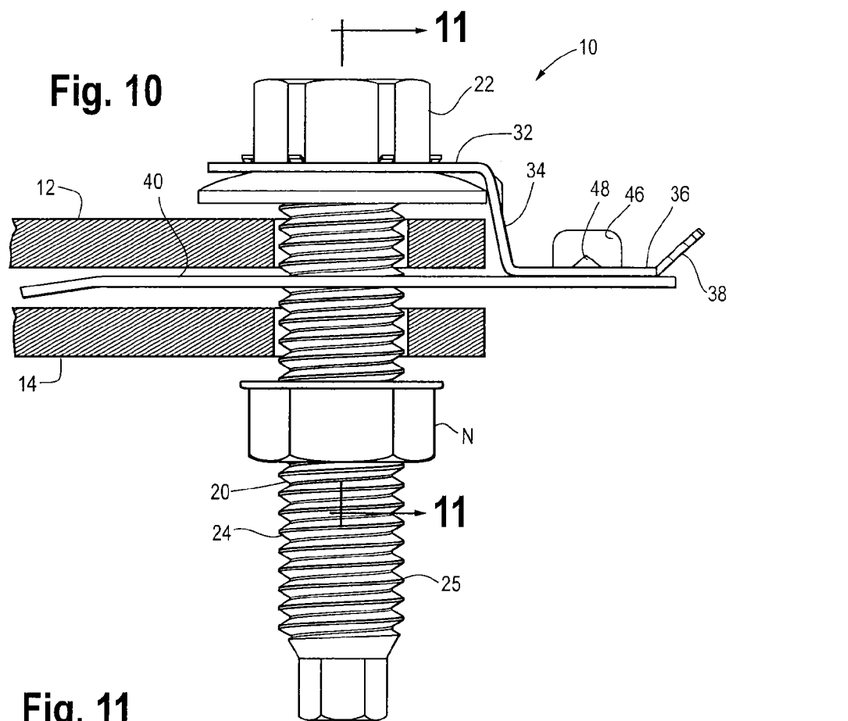
FIG. 10 is an elevation view of the quickie stud assembly in use with two panels.
Figure 11:
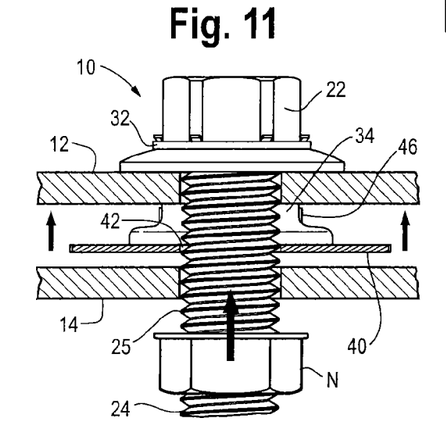
FIG. 11 is a cross-sectional view of the quickie stud assembly of FIG. 10 along lines 11-11 in use with two panels.

The quickie stud assembly 10 may be of any appropriate shape, size, type or configuration, such as of a general T-shaped configuration, such as shown for example in FIGS. 6-7 and 10. The quickie stud assembly 10 may be fabricated out of any appropriate types of materials, such as metal, both metal and plastic, or any such other similar material or combination thereof. The quickie stud assembly 10 may include a fastener 20, a first clip also referred to as an upper clip 30 and a second clip also referred to as a lower clip 40.

The fastener 20 may be a bolt 20 as shown in the drawings and may be of any appropriate shape, size, type or configuration, such as a generally cylindrical shape as shown in FIGS. 6-7 and 10. The bolt 20 may be fabricated out of any appropriate type of materials, such as for example metal, or any other suitable material. The bolt 20 may be located at any appropriate position on the quickie stud assembly 10, such as in a generally perpendicular position to that of the upper clip 30 and lower clip 40, as shown in FIGS. 6-7 and 10.

The bolt 20 may include a head 22 and a shaft 24. The head 22 and shaft 24 may be of any appropriate shape, size or type, and are not limited to that shown in the drawings. The head 22 may be integrally formed with the shaft 24 or may otherwise be attached by any suitable means. By way of a non-limiting example, the shaft 24 may include any appropriate number or type of threads 25 along any portion of its length, including, without limitation the majority of the length thereof as shown in FIGS. 7 and 10. The head 22 may be located on one end of the shaft 24 opposite the threads 25.

Figure 8:
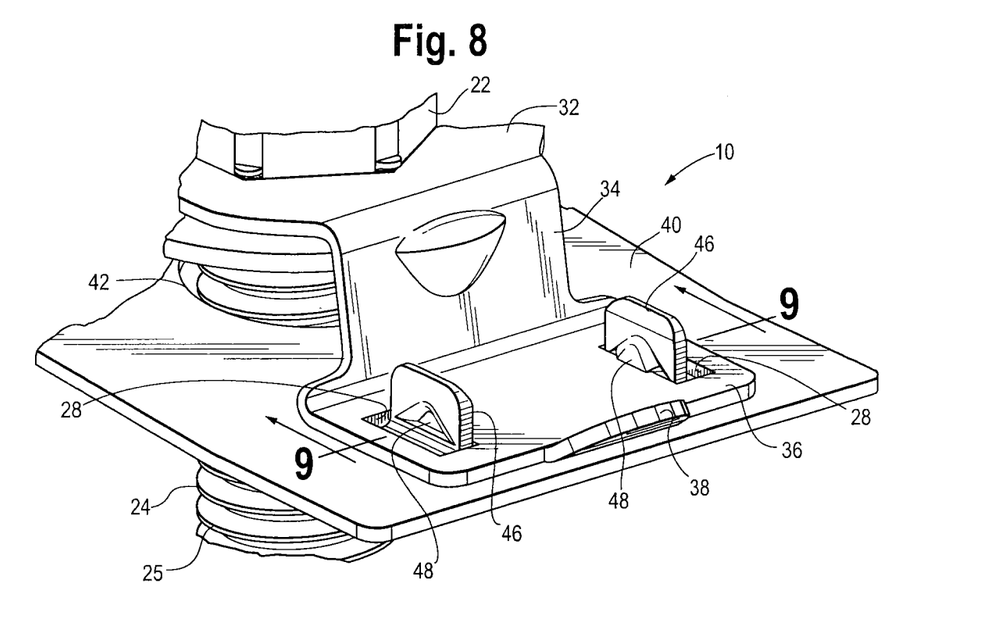
FIG. 8 is a close up perspective view of snap features of the quickie stud assembly.

The upper clip 30 may be of any appropriate shape, size, type or configuration, such as of a generally rectangular, square, or otherwise planar shape, but is not limited to such. By way of a non-limiting example, the upper clip 30 may be of a generally S-shaped configuration as shown in FIGS. 6, 8 and 10, or alternatively, may be of any appropriate shape and is not limited to just the shape shown in the drawings. The upper clip 30 may be fabricated out of any appropriate type of materials, such as for example, metal, plastic or the like. The upper clip 30 may be located at any appropriate position on the quickie stud assembly 10, such as adjacent to and spaced from the lower clip 40, as shown in FIGS. 6, 8 and 10. The upper clip 30 may be secured to the bolt 20 in any suitable manner, for example, as described below.

The upper clip 30 may, by way of a non-limiting example, include an upper shelf or bolt section 32, a shoulder 34 and a lower shelf or retaining section 36. The upper shelf 32 may be of any appropriate shape or size, such as by way of a non-limiting example be of a generally rectangular or square shape. The upper shelf 32 may include an aperture 37 for receiving the bolt 20 therethrough. As shown in FIG. 6, the aperture 37 may be sized so that the bolt 20 is in close proximity to the aperture 37 when the bolt 20 is passed therethrough so as to substantially reduce or minimize the space between the aperture 37 and the bolt 20. The upper shelf 32 may be located at any appropriate position on the upper clip 30, such as being located on a first side of the shoulder 34, as shown in FIGS. 6, 8 and 10.

The shoulder 34 may be of any appropriate shape or size, such as by way of a non-limiting example of a generally rectangular or square shape. The shoulder 34 may be located at any appropriate position on the upper clip 30 and may either be integrally formed therewith or attached in a subsequent operation. For example, the shoulder 34 may be located between the upper and lower shelves 32, 36 and may connect the upper shelf 32 to the lower shelf 36 as a transition between the two shelves 32, 36.

Figure 9:
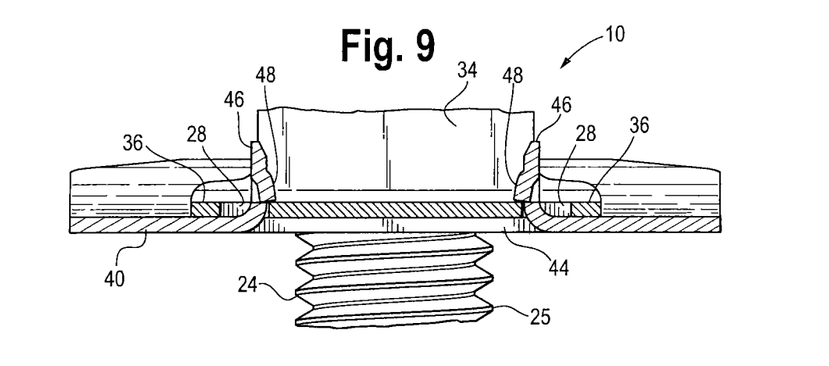
FIG. 9 is a cross-sectional view of the snap features of the quickie stud assembly of FIG. 8 along lines 9-9.

The lower shelf 36 may be of any appropriate shape or size, such as by way of a non-limiting example of a generally rectangular or square shape. The lower shelf 36 may be located at any appropriate position on the upper clip 30, such as being spaced from the upper shelf 32. The lower shelf 36 may be integrally formed with the upper shelf 32 and/or the shoulder 34 or may be attached thereto through a subsequent operation. The lower shelf 36 may include at least one snap member such as for example a tab aperture 28 as shown in FIGS. 6, 8-9. By way of a non-limiting example, the lower shelf 36 may include a pair of tab apertures 28; although any number of such may be included. The tab apertures 28 may be of any appropriate shape or size, such as by way of a non-limiting example be of a generally rectangular or square shape, and may be integrally formed with the lower shelf 36 or created thereto through a subsequent operation, such as for example stamping, drilling, piercing or the like. The tab apertures 28 may be located at any appropriate position on the lower shelf 36, such as being located spaced apart from each other on the lower shelf 36.

The lower shelf 36 may also include at least one flap 38. The flap 38 may be of any appropriate shape or size, such as by way of a non-limiting example of a generally rectangular or semi-circular shape. The flap 38 may be located at any appropriate position on the lower shelf 36, such as being located distally from the upper shelf 32 and between the tab apertures 28. By way of a non-limiting example, the flap 38 may be located opposite that of the shoulder section 34. The flap 38 may be integrally formed with the lower shelf 36 or alternatively may be attached thereto through a subsequent operation.

The lower clip 40 may be of any appropriate shape, size, type or configuration, such as by way of a non-limiting example of a generally rectangular or square shape. The lower clip 40 may be fabricated out of any appropriate type of materials, such as for example metal or the like. The lower clip 40 may be located at any appropriate position on the quickie stud assembly 10, such as spaced from and parallel with the upper shelf 32 and adjacent to and parallel to the lower shelf 36, both of the upper clip 30. The lower clip 40 may include a bolt aperture 42, an upper clip aperture 44 and at least one snap member such as for example at least one tab 46. The lower clip 40 may act as a spring/biasing member that keeps the quickie stud assembly 10 in contact with the panels 12, 14 during installation thereof.

The bolt aperture 42 may be of any appropriate shape or size, such as by way of a non-limiting example of a generally rectangular or circular shape. By way of a non-limiting example, the bolt aperture 42 may be of substantially the same shape as that of a cross-section of the bolt 20 and may be of a size such that when the bolt 20 may be passed therethrough, it is approximately immediately adjacent the bolt aperture 42. The bolt aperture 42 may be located at any appropriate position on the lower clip 40, such as being located at an approximate central location of the lower clip 40.

Figure 12:
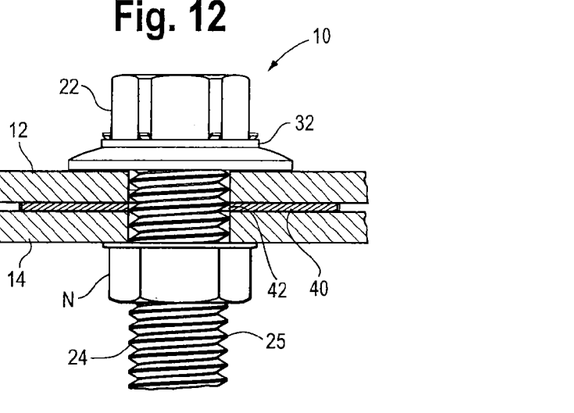
FIG. 12 is a cross-sectional view of the quickie stud assembly of FIG. 10 along lines 11-11 in use with two panels.

The upper clip aperture 44 may be of any appropriate shape or size, such as by way of a non-limiting example of a generally rectangular, circular, oval or square shape. The upper clip aperture 44 may be located at any appropriate position on the lower clip 40, such as being located adjacent to the bolt aperture 42. By way of a non-limiting example, the upper clip aperture 44 may be located parallel to the lower shelf 36 of the upper clip 30 and adjacent thereto. The bolt aperture 42 may of such a size whereby it may be tight to the threads 25 of the bolt 20. The proper sizing of the aperture 42 may prevent torque loss and/or distortion of the panels 12, 14 when the quickie stud assembly is used to secure the panels 12, 14 together. An example of this is shown in FIG. 12. Stated another way, when the bolt 20 is in close proximity to the bolt aperture 42 this may reduce torque loss and/or distortion of the panels 12, 14 during installation of the quickie stud assembly 10 to secure the panels 12, 14 together. The lower clip 40 substantially fills the space around the bolt 20 such that the gap G that was present in the prior art stud assembly 100 is substantially eliminated. The elimination of this gap G may substantially eliminate the distortion between the panels 12, 14 that may otherwise result, which also substantially eliminates the distortion that may otherwise result.

The snap member/tab 46 may be of any appropriate shape or size, such as by way of a non-limiting example of a generally rectangular or square shape. The lower clip 40 may include any appropriate number of tabs 46, such as, for example, a pair of tabs 46, although any number of tabs 46 may be used. The tabs 46 may be integrally formed with the lower clip 40 or may be attached by way of a subsequent operation, e.g., welding or the like. The tabs 46 may be located at any appropriate position on the lower clip 40, such as being located adjacent the upper clip aperture 44. By way of a non-limiting example, the tabs 46 may be located on each side of the upper clip aperture 44 and may extend in a direction substantially perpendicular from the lower clip 40, such that they may point in the direction of the upper clip 30. By way of a non-limiting example, the tabs 46 may be formed in conjunction with the upper clip aperture 44, such as for example, by stamping, drilling, puncturing, or the like. The tabs 46 may each include at least one retaining member or projection 48.

The retaining members or projections 48 may be of any appropriate shape or size, such as by way of a non-limiting example of a generally rectangular, semi-circular or triangular shape. The retaining members 48 may be located at any appropriate position on the tabs 46, such as being located adjacent the upper clip aperture 44. By way of a non-limiting example, the retaining members 48 may be located in a position whereby the retaining members 48 may catch onto or engage the lower shelf 36 of the upper clip 30. The projections 48 may be integrally formed with the tabs 46 or may be attached in a subsequent operation, e.g., welding or the like.

The quickie stud assembly 10 may be assembled in any appropriate manner, such as by inserting the bolt 20 into the upper clip 30 through the aperture 37 and then through the bolt aperture 42 of the lower clip 40. The upper clip 30 may be attached to the lower clip 40 such as by snapping the tabs 46 of the lower clip 40 into the tab apertures 28 of the upper clip 30 in such a way that the upper clip 30 may be securely held to the lower clip 40 with a minimum of removal force. The flap 38 may be used to assist in securing the tabs 46 to the tab apertures 28. The engagement of the tabs 46, including the retaining members 48 to the tab apertures 28 and the lower shelf 36 of the upper clip 30, respectively creates a snap member and a snap tab that snappingly engage one another. While the engagement of the tabs 46 and the tab apertures 28 are shown, any kind of engaging device, such as snap engaging members (or snap-in members) may be used. The head 22 of the bolt 20 may then be crimped such that it is secured to the upper clip 30 and held in place.

Additional embodiments of a quickie stud assembly according the present teachings are described below. In the description, all of the details and components may not be fully described or shown. Rather, the main features or components are described and, in some instances, differences with the above-described embodiment may be pointed out. Moreover, it should be appreciated that these additional embodiments may include elements or components utilized in the above-described embodiment although not shown or described. Thus, the description of these additional embodiments is merely exemplary and not all-inclusive nor exclusive. Moreover, it should be appreciated that the features, components, elements and functionalities of the various embodiments may be combined or altered to achieve a desired quickie stud assembly without departing from the spirit and scope of the present invention.

Figure 13:
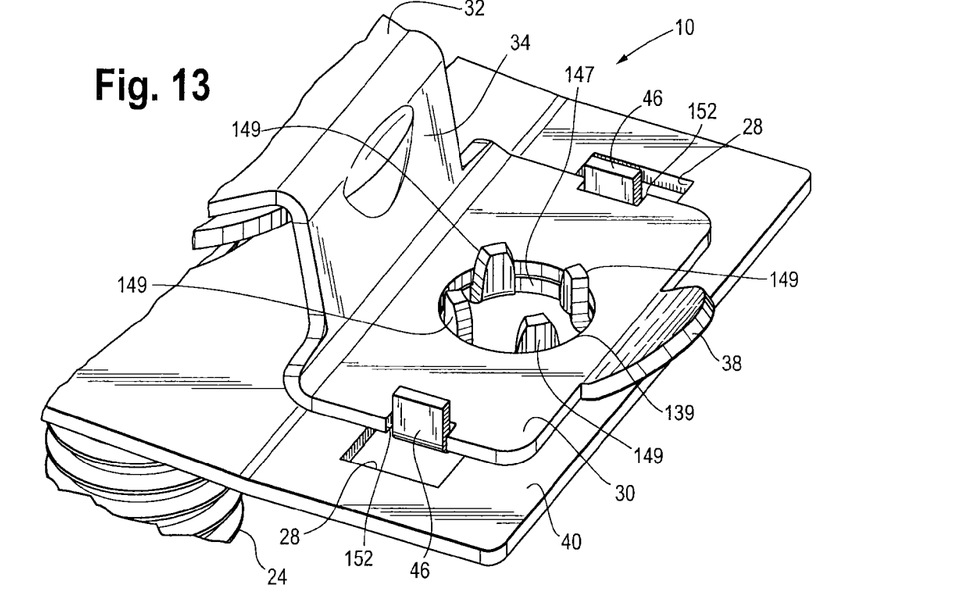
FIG. 13 is a close up perspective view of an alternative embodiment of a quickie stud assembly.

In an alternative embodiment shown in FIG. 13, the upper clip 30 may include a female snap member; such as for example, an aperture 139 and the lower clip 40 may include an aperture 147 that may substantially align with the aperture 139 when the quickie stud assembly 10 is assembled. Further, the lower clip 40 may include at least one male snap member 149 that extends from the aperture 147. As shown in FIG. 13, a plurality of snap members 149 may extend from the aperture 147, such as by way of a non-limiting example, the four snap members 149 shown in FIG. 13. Further, the snap members 149 may comprise a tab 149 that extends upward from the aperture 147 such that the tabs 149 engage the aperture 139 further securing the upper clip 30 with the lower clip 40.

In the embodiment of FIG. 13, the upper clip 30 may optionally include a cut-out portion 152 or a plurality of cut-out portions 152 that engage the tabs 46 of the lower clip 40 to further secure the upper clip 30 with the lower clip 40. It should be understood, however, that the cut-out portion 152 and the tab 46 in this embodiment may be optionally included or excluded. Moreover, the tab 46 may be bent similar to that shown in FIG. 16 to further secure the upper clip 30 with the lower clip 40.

Figure 14:
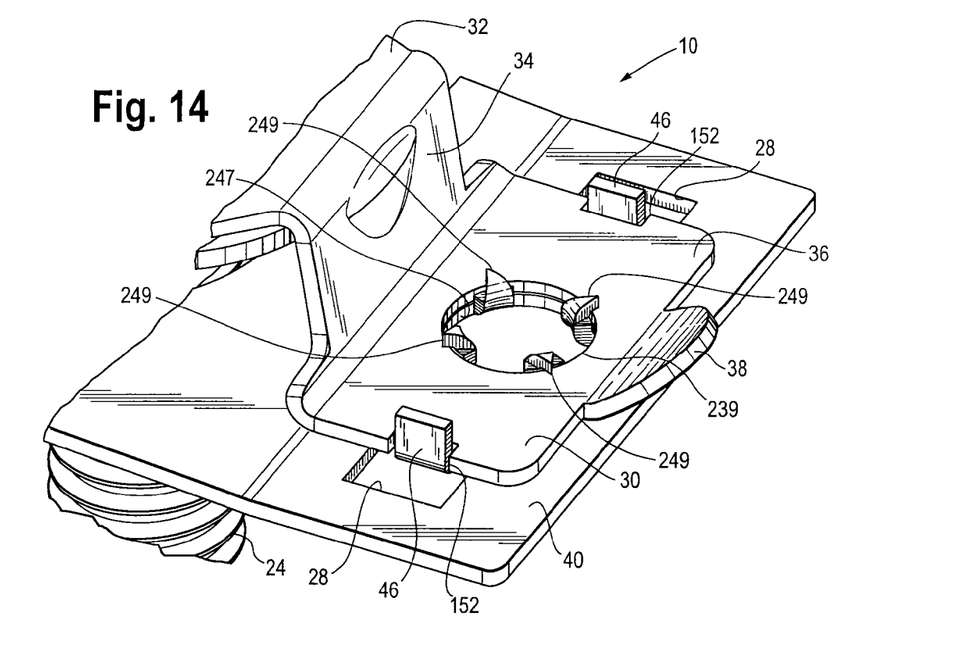
FIG. 14 is a close up perspective view of another alternative embodiment of a quickie stud assembly.

In yet another alternative embodiment shown in FIG. 14, the upper clip 30 may include a female snap member; such as for example, an aperture 239 and the lower clip 40 may include an aperture 247 that may substantially align with the aperture 239 when the quickie stud assembly 10 is assembled. Further, the lower clip 40 may include at least one male snap member 249 that extends from the aperture 247. As shown in FIG. 14, a plurality of snap members 249 may extend from the aperture 247, such as by way of a non-limiting example, the four snap members 249 shown in FIG. 14. Further, the snap members 249 may comprise a tab 249 that extends upward from the aperture 247 such that the tabs 249 may be bent towards the upper clip 30 such that they engage lower shelf 36 of the upper clip 30 further securing the upper clip 30 with the lower clip 40.

Figure 15:
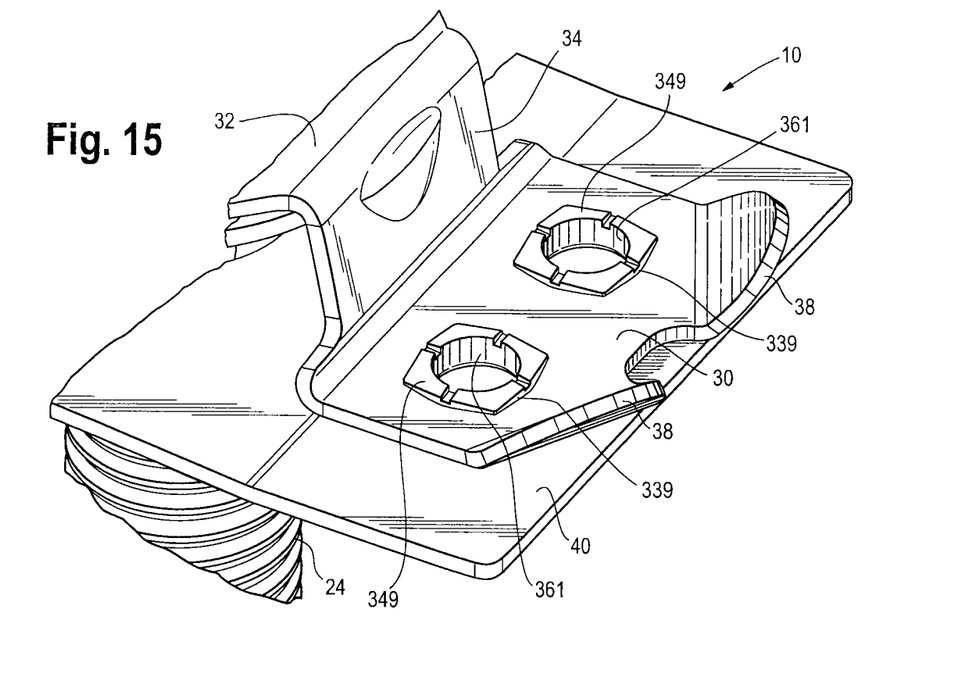
FIG. 15 is a close up perspective view of another alternative embodiment of a quickie stud assembly.

In yet another alternative embodiment shown in FIG. 15, the upper clip 30 may include a female snap member, such as for example, an aperture 339 and the lower clip 40 may include a male snap member 349 such that the male snap member 349 engages the aperture 339 of the upper clip 30 securing the lower clip 40 with the upper clip 30. In a further alternative embodiment, the upper clip 30 may include at least two apertures 339 and the lower clip 40 may include a corresponding number of male snap members 349. In this embodiment, the apertures 339 may substantially align with the male snap members 349 such that when the upper clip 30 and lower clip 40 are aligned, the male snap members 349 may engage the apertures 339 securing the lower clip 40 with the upper clip 30.

As further shown in FIG. 15, the male snap members 349 of the lower clip 40 may include apertures 361. The apertures 361 may optionally be included. The apertures 361 may result from material of the lower clip 40 being used to integrally form the male snap members 349, or alternatively may allow the male snap members 349 to be attached to the lower clip 40, such as by welding or the like.

Figure 16:
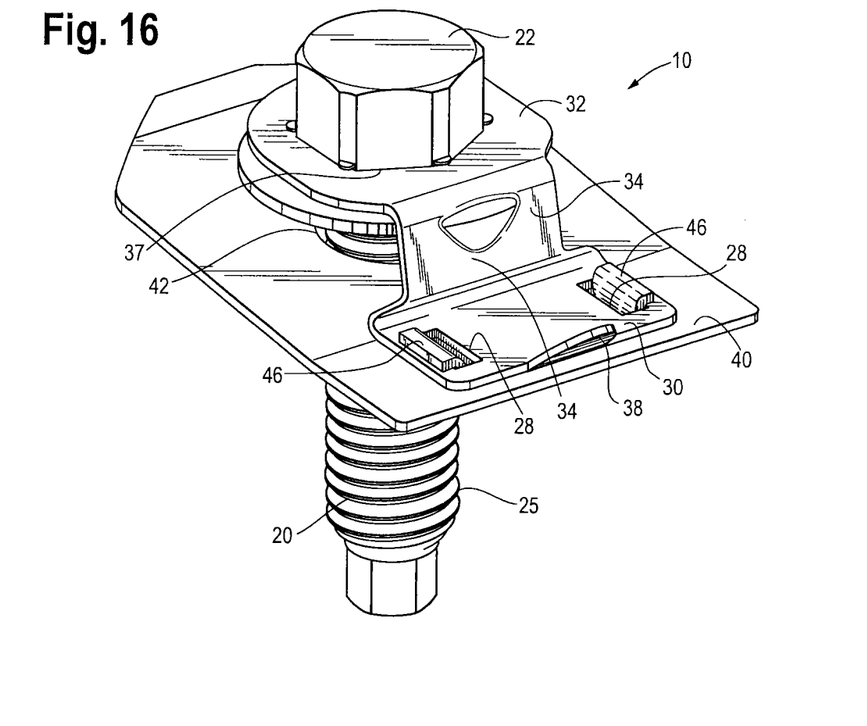
FIG. 16 is a perspective view of yet another alternative embodiment of a quickie stud assembly.

In yet another alternative embodiment shown in FIG. 16, the tabs 46 may optionally include or not include the retaining member 48. In this alternative embodiment, the tabs 46 may be used to attach the upper clip 30 to the lower clip 40 such as by inserting the tabs 46 of the lower clip 40 into the tab apertures 28 of the upper clip 30 and then bending the tabs 46 toward the upper clip 30. In this embodiment, the tabs 46 may be bent in any direction toward the upper clip, not just that shown in FIG. 16. Additionally, the tabs 46 may be bent at any appropriate angle, not just that shown in FIG. 16. By way of a non-limiting example, the tab 46 may be bent toward the upper clip 30 until the upper clip 30 and lower clip 40 are secured together and are substantially held in place together. As with the previous embodiment, the flap 38 may be used to assist in securing the tabs 46 to the tab apertures 28. The engagement of the tabs 46 to the tab apertures 28 and the lower shelf 36 of the upper clip 30, respectively creates a snap member and a snap tab that snappingly engage one another.

The quickie stud assembly 10 may not only prevent torque loss/sporadic torque, but it may substantially eliminate additional processing steps to accomplish this type of assembly, such as for example, it may eliminate the additional process that may otherwise be necessary. The snap in feature (the use of the tabs 46 and retaining members 48 in the tab apertures 28) of the quickie stud assembly 10 also may allow the assembly to be done after parts are heat treated and/or finished, which may further reduce the steps necessary to create and assembly the quickie stud assembly 10.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A stud assembly comprising:
   a bolt;
   a first clip having a first snap member comprising at least one aperture, an aperture circumscribed by a shelf and a shoulder connected with and extending from the shelf, wherein the bolt is received through the aperture; and
   a second clip engaged with the bolt a predetermined distance from the first clip, the second clip having a second snap member, wherein the first snap member selectively snap fits onto the second snap member attaching the first clip to the second clip.

2. The stud assembly of claim 1, wherein the second snap member comprises a plurality of tabs extending from the second clip through the aperture in the first clip.

3. The stud assembly of claim 2, wherein the plurality of tabs are bent towards the first clip engaging the first clip.

4. The stud assembly of claim 2 further comprising a retaining member positioned on at least one of the plurality of tabs.

5. The stud assembly of claim 4 wherein the retaining member engages the first snap member of the first clip to secure the first clip with the second clip.

6. The stud assembly of claim 2, wherein the plurality of tabs are bent to engage the first snap member of the first clip to secure the first clip with the second clip.

7. The stud assembly of claim 1 wherein the second snap member comprises a male snap member engaging the aperture of the first clip.

8. The stud assembly of claim 1, wherein the first snap member comprises a pair of apertures and the second snap member comprises a pair of male snap members engaging the pair of apertures of the first snap member.

9. The stud assembly of claim 1, wherein the bolt includes a head and threads laterally disposed from the head and wherein a portion of the head is deformed to secure the first clip with the bolt.

10. A stud assembly for securing first and second panels together, the stud assembly comprising:
    a bolt capable of engaging the first and second panels;
    a first clip having a bolt section, a retaining section and a shoulder positioned between the bolt and retaining sections, wherein the bolt is received within the bolt section;
    an aperture positioned on the retaining section of the first clip;
    a second clip having a bolt aperture, wherein the bolt is received within the bolt aperture and is positioned a predetermined distance from the first clip;

a male snap member attached to the second clip, the male snap member engaged with the aperture to secure the first clip to the second clip; and wherein the first panel is positionable in the predetermined distance between the first and second clips.

11. The stud assembly of claim 10, wherein the bolt is adjacent to the bolt aperture of the second clip substantially eliminating distortion during securing the first panel to the second panel.

12. The stud assembly of claim 11, wherein the male snap member comprises a plurality of tabs extending from the second clip through and engaging the aperture in the first clip.

13. The stud assembly of claim 11, wherein the male snap member comprises at least one tabs extending from the second clip through the aperture in the first clip wherein the at least one tab is bent towards the first clip engaging the first clip.

14. The stud assembly of claim 11, wherein the male snap member comprises a tab that is bent to engage the aperture to secure the first clip to the second clip.

15. The stud assembly of claim 14, further comprising a nut threadably attached with the bolt distal from the head, wherein the nut is capable of engaging the second panel.

16. The stud assembly of claim 15, wherein the first panel is capable of being positioned between the first clip and the second clip and the second panel is capable of being positioned between the second clip and the nut to secure the first and second panels together.

* * * * *